(12) United States Patent
Serughetti et al.

(10) Patent No.: US 8,999,505 B2
(45) Date of Patent: Apr. 7, 2015

(54) SIZING COMPOSITION IN THE FORM OF A PHYSICAL GEL FOR GLASS STRANDS, GLASS STRANDS OBTAINED AND COMPOSITES COMPRISING THE SAID STRANDS

(75) Inventors: Dominique Serughetti, Paris (FR); Jean-Baptiste Denis, Bois Colombes (FR); Patrick Moireau, Curienne (FR)

(73) Assignee: Saint-Gobain Adfors, Chambery (FR)

( * ) Notice: Subject to any disclaimer, the term of this patent is extended or adjusted under 35 U.S.C. 154(b) by 1159 days.

(21) Appl. No.: 12/676,612

(22) PCT Filed: Sep. 4, 2008

(86) PCT No.: PCT/FR2008/051572
§ 371 (c)(1),
(2), (4) Date: Mar. 5, 2010

(87) PCT Pub. No.: WO2009/044042
PCT Pub. Date: Apr. 9, 2009

(65) Prior Publication Data
US 2011/0033702 A1    Feb. 10, 2011

(30) Foreign Application Priority Data
Sep. 6, 2007 (FR) ...................................... 07 57377

(51) Int. Cl.
*D02G 3/00* (2006.01)
*B32B 27/04* (2006.01)
*C03C 25/26* (2006.01)

(52) U.S. Cl.
CPC ...................................... *C03C 25/26* (2013.01)

(58) Field of Classification Search
CPC   C03C 25/10; C03C 25/1025; C03C 25/1005; C03C 25/101; C03C 25/24; C03C 25/26; C03C 25/32; C03C 25/321; C03C 25/28; C03C 25/285; C03C 25/328; C03C 25/36; C03C 25/40
See application file for complete search history.

(56) References Cited

U.S. PATENT DOCUMENTS

| | | | |
|---|---|---|---|
| 3,705,073 A * | 12/1972 | Janetos | 428/378 |
| 3,837,898 A | 9/1974 | McCombs et al. | |
| 4,065,417 A | 12/1977 | Wong et al. | |
| 4,581,153 A * | 4/1986 | Trabitzsch et al. | 510/418 |
| 4,839,449 A * | 6/1989 | Billmers et al. | 526/238.2 |
| 4,929,670 A * | 5/1990 | Billmers et al. | 525/54.1 |
| 4,973,680 A * | 11/1990 | Billmers | 536/58 |
| 5,312,687 A * | 5/1994 | Pollet et al. | 428/372 |
| 5,514,792 A * | 5/1996 | Knipper et al. | 536/124 |
| 2008/0213560 A1 * | 9/2008 | Moireau et al. | 428/222 |
| 2009/0092832 A1 * | 4/2009 | Moireau | 428/378 |
| 2009/0239056 A1 * | 9/2009 | Moireau et al. | 428/296.4 |
| 2011/0033702 A1 * | 2/2011 | Serughetti et al. | 428/378 |
| 2012/0156377 A1 * | 6/2012 | Veith et al. | 427/331 |

FOREIGN PATENT DOCUMENTS

| | | | | |
|---|---|---|---|---|
| FR | 2 895 398 A1 | 6/2007 | | |
| WO | WO 03/006532 A1 | 1/2003 | | |
| WO | WO 2005077854 A1 * | 8/2005 | | C03C 25/44 |
| WO | WO 2006/043011 A1 * | 4/2006 | | |
| WO | WO 2006043011 A1 * | 4/2006 | | C03C 25/10 |

* cited by examiner

*Primary Examiner* — Jill Gray
(74) *Attorney, Agent, or Firm* — Oblon, McClelland, Maier & Neustadt, L.L.P.

(57) ABSTRACT

The present invention relates to a sizing composition in the form of a physical gel for glass strands which contains 0.1 to 5% by weight of at least one texturing agent chosen from xanthans, guars and succinoglycans, 2 to 8% by weight of at least one film-forming agent, 0.1 to 8% by weight of at least one compound chosen from plasticizing agents, surface-active agents and dispersing agents, 0.1 to 4% by weight of at least one coupling agent, and 0 to 6% by weight of at least one additive. Another subject-matter of the present invention is glass strands coated with the abovementioned sizing composition and the composite materials containing an organic or inorganic material reinforced with the said glass strands.

15 Claims, No Drawings

SIZING COMPOSITION IN THE FORM OF A PHYSICAL GEL FOR GLASS STRANDS, GLASS STRANDS OBTAINED AND COMPOSITES COMPRISING THE SAID STRANDS

CROSS-REFERENCE TO RELATED APPLICATIONS

This application is the US counterpart of WO 2009/0044042, the text of which is incorporated by reference and claims the benefit of priority from the French application No. 0757377 filed on Sep. 6, 2007, the text of which is also incorporated by reference.

The present invention relates to a sizing composition for glass strands intended in particular to reinforce organic and/or inorganic matrices, to the glass strands obtained and to the composites incorporating the said glass strands. More specifically, it relates to an aqueous sizing composition which is provided in the form of a physical gel having a rheological behaviour of the thixotropic type.

Reinforcing glass strands are conventionally prepared by mechanically drawing molten glass streams flowing by gravity from the multiple orifices of bushings filled with molten glass, to form filaments which are gathered together into base strands, which strands are then collected.

During the drawing, and before they are gathered together into strands, the glass filaments are coated with a sizing composition, generally an aqueous sizing composition, by passing over a sizing member.

The role of the size is essential in two respects.

During the manufacture of the strands, the size protects the filaments from the abrasion resulting from the rubbing of the latter at high speed over the members of the process, acting as lubricant. It also makes it possible to remove the electrostatic charges generated during this rubbing. Finally, it gives cohesion to the strand by providing bonding of the filaments to one another.

During the use for the purpose of producing composite materials, the size improves the wetting of the glass and the impregnation of the strand by the material to be reinforced and it promotes the adhesion between the glass and the said material, thus resulting in composite materials having improved mechanical properties.

The glass strands in their various forms (continuous, chopped or milled strands, mats of continuous or chopped strands, meshes, wovens, knits, and the like) are commonly used to effectively reinforce matrices of varied natures, for example thermoplastic or thermosetting materials and cement.

The most commonly employed sizing compositions are aqueous compositions, in particular "plastic" sizing compositions including a film-forming agent of the polymer type which exhibits in particular the advantage of giving mechanical cohesion to the final size and of protecting the strands against mechanical damage and attacks from chemicals and the environment.

These sizing compositions are composed to more than 80% by weight of water and consequently have a low viscosity, generally at most equal to 5 mPa·s, which makes it possible to be able to easily deposit them with relatively simple sizing devices, for example using a sizing roll over which the glass filaments pass at high speed. The conditions of the process are adjusted so that the desired amount of size is deposited during the passage of the strand over the sizing device.

However, the presence of water in such a high amount in the sizing composition exhibits disadvantages.

Owing to the fact that it is not very viscous, the sizing composition does not hold well to the glass when the strand comes into contact with the various elements which act to guide it up to the winder. A draining phenomenon occurs, followed by centrifugal projection of the size under the effect of the drawing speed. A portion of the sizing composition is also lost under the effect of the centrifugal force during the winding of the strand. The loss can range up to 50%, depending on the sizing compositions.

Furthermore, water is harmful to the mechanical properties of the final composite as it reduces adhesion between the glass strands and the material to be reinforced. The water consequently has to be removed, which conventionally takes place by drying the packages of strands in a large chamber heated to a temperature of the order of 100 to 150° C. for 10 to 20 hours, depending on the weight of the package and its initial water content. Apart from the fact that it is expensive and lengthy, the drying operation brings about selective migration of the constituents of the size as a function of their affinity for water and their molecular weight, essentially from the inside to the outside of the package, and a significant increase in the amount of size (up to 800%) on the strand situated at the periphery with respect to the centre of the package. As a result of this variation, the properties of the strand are not constant over the entire length of the package, which is reflected in particular by processing problems in weaving operations and the appearance of impregnation defects (spots) in composites having an organic matrix.

One means of overcoming this disadvantage consists in "peeling" the package by removing a certain length of strand situated at the periphery in order to retain only the portion of strand comprising the required amount of size. As a general rule, the properties of the strand are regarded as acceptable if the ratio of the maximum content of size on the strand in the package to the nominal content of the size is at most equal to 2, Above this value, the quality of the strand is not satisfactory for the targeted applications (appearance of the defects mentioned in the preceding paragraph). The amount of strand to be removed in order for this ratio to be satisfactory generally represents 2 to 5% of the weight of the package. This operation is expensive as it requires specific installations and additional operators.

The same phenomenon of migration of the size is observed on straight-sided packages, such as rovings, for example obtained by winding the strand directly under the bushing. However, in this case, the size migrates both towards the periphery and the sides of the package. For this reason, the above-mentioned peeling solution cannot be applied.

The aim of the present invention is to limit the migration of the size during the drying of the packages.

This aim is achieved according to the invention by a sizing composition for glass strands which comprises a texturing agent capable of conferring, on the said composition, the appearance of a physical gel.

Another subject-matter of the invention is the abovementioned glass strands coated with the sizing composition.

A further subject-matter of the invention is the composite materials comprising an organic and/or inorganic matrix reinforced by the glass strands in accordance with the invention.

More specifically, a subject-matter of the invention is a sizing composition in the form of a physical gel comprising (as % by weight):

0.1 to 5% of at least one texturing agent
2 to 8% of at least one film-forming agent 0.1 to 8% of at least one compound chosen from the group consisting of plasticizing agents, surface-active agents and dispersing agents 0.1 to 4% of at least one coupling agent 0 to 6% of at least one additive.

The sizing composition according to the invention is provided in the form of a physical gel having a rheological behaviour of the thixotropic type.

The term "physical gel" is understood to mean a system comprising a compound capable of being arranged in the form of a finely dispersed solid phase in a predominant liquid phase and of forming a network of low density which is easy to destructure by virtue of the presence of weak bonds, this network being reversible.

The term "thixotropic behaviour" is understood to mean the combination of mechanisms which mean that a fluid experiences a decrease in its viscosity when it is subjected to an increase in the shear stress and regains the initial level of viscosity when said stress ceases.

The physical gel in accordance with the invention has the ability to be converted to a liquid of low viscosity, generally of less than 100 mPa·s, when it is subjected to shearing of the order of $1 \times 10^6$ s$^{-1}$, corresponding to the passage of the glass filaments over the sizing device.

The physical gel state of the sizing composition according to the invention is obtained by adding at least one texturing agent to the sizing composition, this texturing agent being chosen from specific polymers which are characterized in that they comprise a high proportion of hydroxyl functional groups.

The texturing agent in accordance with the invention is chosen from polysaccharides, such as xanthans, guars and succinoglycans, in particular exhibiting an average molecular weight of greater than 100 000, preferably of less than $10 \times 10^6$ and advantageously of less than $5 \times 10^6$. Xanthans and succinoglycans are preferred.

Advantageously, the xanthan corresponds to the below formula (I)

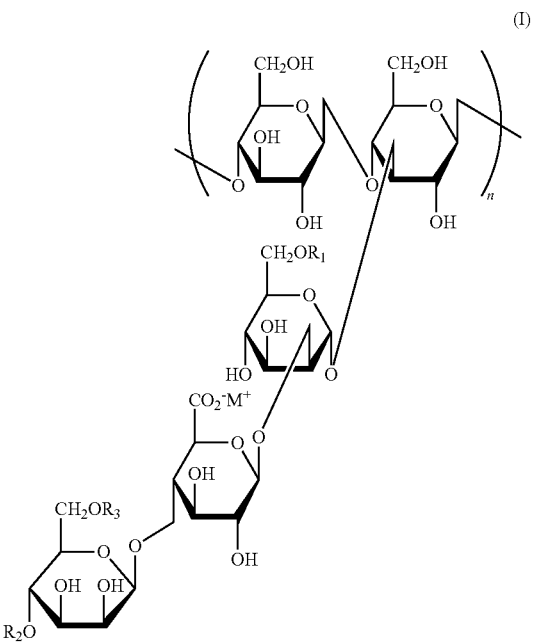

in which:
$M^+$=Na, K or ½ Ca
$R_1$=H or —COCH$_3$
with $R_2$, $R_3$=H or

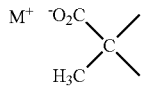

or
$R_2$=H and $R_3$=—COCH$_3$
$n \geq 100$.

Advantageously, the succinoglycan corresponds to the below formula (II)

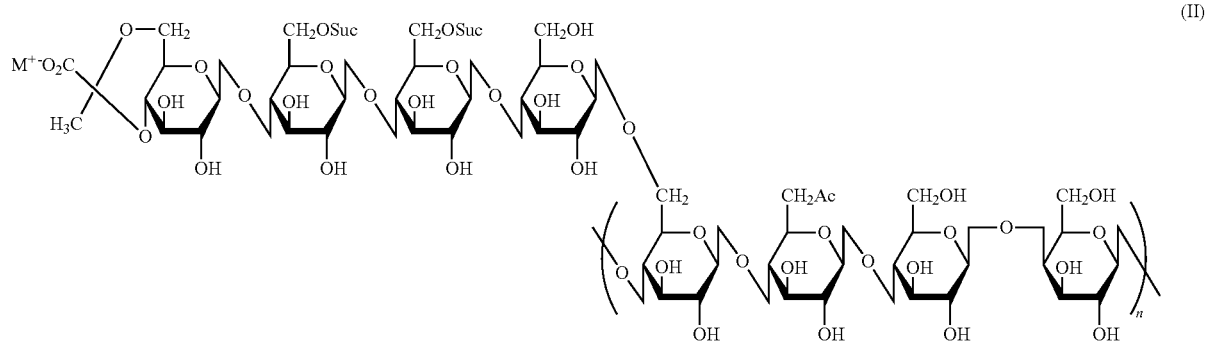

in which:
Ac=—CO—CH$_3$
Suc=—CO—(CH$_2$)$_2$—COOH
$M^+$=Na, K or ½ Ca
$n \geq 80$.

Preferably, the content of texturing agent varies from 0.15 to 2% by weight of the sizing composition and it is advantageously less than 0.6%.

The polymeric film-forming agent plays several roles: it makes it possible to protect the glass filaments from abrasion during drawing, on the one hand, and the strand from attacks from chemicals and the environment, on the other hand; it confers integrity on the strand; finally, it improves the compatibility of the sizing composition with the matrix to be reinforced.

The choice of the film-forming agent depends largely on the chemical nature of the material to be reinforced.

The film-forming agent can be chosen from polyvinyl acetates (homopolymers or copolymers, for example copolymers of vinyl acetate and of ethylene), polyesters, polyethers, epoxy compounds, polyacrylics (homo- or copolymers) and polyurethanes. Polyvinyl acetates, epoxy compounds and polyethylene glycols with a weight of greater than or equal to 20 000 are preferred.

The film-forming agent is generally introduced into the sizing composition in the form of an emulsion.

Preferably, the content of film-forming agent varies from 2.5 to 7% by weight of the sizing composition.

The sizing composition comprises at least one compound chosen from the group consisting of plasticizing agents, surface-active agents and dispersing agents, the role of which is to promote the suspending and to make possible homogeneous dispersion of the various constituents of the composition while preventing problems of separation of the liquid phases, and to provide efficient and rapid wetting of the strands by the material to be reinforced during the manufacture of the composites. The plasticizing, surface-active and dispersing agents often have several functions and for this reason it is difficult to classify them in one or other of the abovementioned categories.

The group composed of plasticizing agents, surface-active agents and dispersing agents comprises:
  organic compounds, in particular
    aliphatic or aromatic polyalkoxylated compounds which are optionally halogenated, such as ethoxylated/propoxylated alkylphenols, preferably including 1 to 30 ethylene oxide groups and 0 to 15 propylene oxide groups, ethoxylated/propoxylated bisphenols, preferably including 1 to 40 ethylene oxide groups and 0 to 20 propylene oxide groups, ethoxylated/propoxylated fatty alcohols, the alkyl chain of which preferably comprises 8 to 20 carbon atoms and including 2 to 50 ethylene oxide groups and up to 20 propylene oxide groups. These polyalkoxylated compounds can be block or random copolymers,
    polyalkoxylated, for example polyethylene glycol, fatty acid esters, the alkyl chain of which preferably comprises 8 to 20 carbon atoms and including 2 to 50 ethylene oxide groups and up to 20 propylene oxide groups,
    amine-comprising compounds, for example amines, which are optionally alkoxylated, amine oxides, alkylamides, sodium, potassium or ammonium succinates and taurates, sugar derivatives, in particular of sorbitan, alkyl sulphates, which are optionally alkoxylated, alkyl phosphates and ether phosphates of sodium, potassium or ammonium, which are optionally alkylated or alkoxylated.
  Inorganic compounds, for example silica derivatives, it being possible for these compounds to be used alone or as a mixture with the abovementioned organic compounds.

The amount of compound chosen from the above-mentioned group preferably varies from 0.15 to 4% by weight of the sizing composition.

The coupling agent makes it possible to provide the attaching of the size to the surface of the glass.

The coupling agent is chosen from hydrolysable compounds, in particular which can be hydrolysed in the presence of an acid, such as acetic, lactic or citric acid, which belong to the group consisting of silanes, such as γ-glycidoxypropyltrimethoxysilane, γ-acryloyloxypropyltrimethoxysilane, γ-methacryloyloxy-propyltrimethoxysilane, poly(oxyethylene/oxypropylene)-trimethoxysilane, γ-aminopropyltriethoxysilane, vinyltrimethoxysilane, phenylaminopropyltrimethoxy-silane, styrylaminoethylaminopropyltrimethoxysilane and tert-butylcarbamoylpropyltrimethoxysilane, siloxanes, such as 1,3-divinyltetraethoxydisiloxane, titanates, zirconates, in particular of aluminium, and the mixtures of these compounds. Preferably, silanes are chosen.

The amount of coupling agent preferably varies from 0.15 to 2% by weight of the sizing composition.

In addition to the abovementioned constituents, which participate essentially in the structure of the size, one or more other constituents may be added as additives.

It is thus possible to introduce at least one lubricating agent, such as a fatty acid ester, which is optionally alkoxylated, for example decyl laurate, isopropyl palmitate, cetyl palmitate, isopropyl stearate, butyl stearate, isobutyl stearate, trimethylolpropane trioctanoate and trimethylolpropane tridecanoate, an alkylphenol derivative, for example ethoxylated octylphenol, a fatty alcohol, which is optionally alkoxylated, for example polyethylene glycol laurate or stearate comprising methyl endings, advantageously comprising less than 10 oxyethylene units, a mixture based on mineral oil, an alkylamine, a polyethylene wax and a mixture of these compounds.

It is also possible to add at least one of the following additives: complexing agent, such as an EDTA derivative, gallic acid or phosphonic acid derivative, antifoaming agent, such as a silicone, a polyol and a vegetable oil, and an acid used to control the pH during the hydrolysis of the coupling agent, for example acetic, lactic or citric acid.

The sizing composition can also comprise at least one compound which makes it possible to control the amount of free hydroxyl groups present in the size after the stage of drying the strand in order to have a weak hydrophilic nature, which makes it possible to retain good resistance to ageing in a humid environment.

This compound is chosen from epoxy compounds and masked isocyanates which can be thermally activated, which are preferably mono- or difunctional and which have a molecular weight of less than 1000, preferably of less than 700.

The epoxy compounds are chosen from aliphatic epoxy compounds, such as butyl glycidyl ether, 1,4-butanediol diglycidyl ether and polyoxyethylene diglycidyl ethers comprising at most 4 ethylene oxide units, cycloaliphatic epoxy compounds, such as cyclohexane-dimethanol diglycidyl ether, or aromatic epoxy compounds, such as phenyl diglycidyl ether.

The masked isocyanates, which can be activated by the thermal route, are chosen from isocyanates including one or more N-oxime, N-caprolactam and furfural groups. The unmasking temperature must correspond to the temperature for drying the strand, generally between 105 and 140° C.

The compound which makes it possible to control the amount of free hydroxyl groups can also be chosen from organic acids exhibiting at least two carboxyl functional groups, for example adipic acid, citric acid, poly(acrylic acid)s and poly(methacrylic acid)s. Generally, these acids exhibit a molecular weight of less than 1000, preferably of less than 500.

Advantageously, a catalyst of the tertiary amine type is used in combination with the epoxy compound or with the isocyanate. The catalyst can be chosen from known compounds, for example substituted phenols, such as tris(dimethylaminomethyl)phenol, and imidazolines, such as N-stearylimidazoline, or their derivatives.

The amount of catalyst does not exceed 1% by weight of the sizing composition.

Preferably, the total content of additives in the sizing composition does not exceed 3%.

The amount of water to be used to form the sizing composition is determined so as to obtain a solids content (dry extract) which varies from 3 to 15%, preferably from 5 to 10%.

The preparation of the sizing composition comprises the following stages consisting in:
a) hydrolysing the coupling agent(s), if appropriate,
b) mixing the coupling agent(s), the film-forming agent, the compound chosen from the group consisting of plasticizing agents, surface-active agents and dispersing agents, optionally additives, and water,
c) adding the texturing agent, preferably with vigorous stirring,
d) applying, to the mixture obtained, a shear force sufficient to form a homogeneous gel.

Another subject-matter of the invention is the glass strands coated with the abovementioned sizing composition.

In the present invention, the term "strands" is understood to mean the base strands resulting from the gathering together under the bushing of a multitude of filaments, and the products derived from these strands, in particular the assemblies of these strands in the form of rovings. Such assemblies can be obtained by simultaneously paying out several packages of base strands and by then gathering them together in tows which are wound onto a rotating support. They may also be "direct" rovings with a count (or linear density) equivalent to that of assembled rovings obtained by gathering together filaments directly under the bushing and winding onto a rotating support.

As mentioned above, the aqueous sizing composition is deposited on the filaments before they are gathered together into base strand(s). The water is usually removed by drying the strands after collection under temperature and duration conditions which make it possible to achieve a water content of less than 0.25%, preferably of less than 0.1%. Generally, drying is carried out at a temperature which varies from 100 to 150° C. for 10 to 20 hours, depending on the type of package and the initial water content.

The sized strand in accordance with the invention can be made of glass of any type, for example E, C, R, AR and glass with a reduced level of boron (less than 6%). E and AR glasses are preferred.

The diameter of the glass filaments constituting the strands can vary to a great extent, for example from 5 to 30 µm. In the same way, the linear density of the strand can vary widely, from 11 to 4800 tex, according to the applications targeted.

As a general rule, the amount of size represents 0.2 to 5% by weight of the final strand, preferably 0.35 to 3%.

A further subject-matter of the invention is a composite material combining at least one organic and/or inorganic material and glass strands coated with the sizing composition described above. The organic material can be composed of one or more thermoplastic or thermosetting polymers and the inorganic material can, for example, be a cement material.

The level of glass in the composite material is generally between 5 and 60% by weight.

The examples given below make it possible to illustrate the invention without, however, limiting it.

In these examples, the following methods are used:

Sizing Composition

1—Preparation a) The coupling agent is hydrolysed by introducing it into a large volume of water (pH approximately 10-12; SILQUEST® A1100 and A1120), if appropriate acidified with an acid, for example acetic acid, citric acid or lactic acid (pH 3.5-5; SILQUEST® A174, A1128, A1387 and A187). The mixture is kept stirred at ambient temperature for approximately 20 minutes.

b) The silanes are mixed, if appropriate, and, with modest stirring, the film-forming agent, the additives (lubricating, surface-active, plasticizing agents, catalyst) and water are successively added to the solution of coupling agent(s), the water being in the amount desired in order to obtain the desired solids content, taking into account the amount of texturing agent to be introduced.

c) The texturing agent is slowly added with vigorous stirring to the mixture from stage b). When a gel appears, a shearing treatment is applied, for example using an ULTRATURRAX® (5000-9000 rpm) for 3 to 5 minutes. The gel is destructured to give a liquid of low viscosity under the effect of mechanical shearing, which makes it possible to homogenize the mixture, and then it is rapidly reformed after stirring is halted.

2—Constituents

Film-Forming Agents

AMP 90, sold by Angus Chemie GmbH: 2-amino-2-methylpropanol

POLYFINISH 40H, sold by Achitex: aqueous emulsion of polypropylene grafted with maleic anhydride; solids content: 40%

VINAMUL® 8828, sold by Celanese: aqueous emulsion of polymer based on vinyl acetate and N-methylolacrylamide; solids content: 52%

VINAMUL® 8852, sold by Celanese: aqueous emulsion of polyvinyl acetate; molecular weight=50 000; solids content: 50%

FILCO® 310, sold by Coim: aqueous emulsion of modified epoxy resin; solids content: 52%

EPIREZ® 3510 W60, sold by Hexion: aqueous emulsion of bisphenol A epoxy resin; molecular weight <700; solids content: 62%

EPIREZ® 3515 W60, sold by Hexion: aqueous emulsion of copolymer resin of bisphenol A-4,4'-(1-methylethylidene) and of 2,2'-[(1-methylethylidene)bis(4,1-phenyleneoxymethylene)]bis[oxirane]; solids content: 62%

NEOXIL® 962D, sold by DSM: aqueous emulsion of epoxy ester resin of low molecular weight (EEW 470-550 g/eq); solids content: 40%

NEOXIL® 961D, sold by DSM: aqueous emulsion of epoxy ester resin of high molecular weight (EEW 3500-6000 g/eq); solids content: 30%

PEG 20000, sold by Clariant: polyethylene glycol; molecular weight 20 000

NAXOL® SH 2500, sold by Scott Bader: poly(ethylene glycol adipate); solids content: 100%

Texturing Agents

KELZAN®, sold by Kelco: xanthan

RHODOPOL® 23, sold by Rhodia: xanthan

RHEOZAN® SH, sold by Rhodia: succinoglycan

Coupling Agents
  SILQUEST® A-174, sold by GE Silicones: γ-methacryloyloxypropyltrimethoxysilane
  SILQUEST® A-1100, sold by GE Silicones: γ-aminopropyltriethoxysilane
  SILQUEST® A-1128, sold by GE Silicones: benzylaminoethyl-γ-aminopropyltrimethoxysilane (50% by weight in methanol)
  SILQUEST® A-1120, sold by GE Silicones: β-aminoethyl-γ-aminopropyltrimethoxysilane
  SILQUEST® A-1387, sold by GE Silicones: polysilazane (50% by weight in methanol)
  SILQUEST® A-187, sold by GE Silicones: γ-glycidoxypropyltrimethoxysilane Dispersing Agents, Lubricating Agents and Plasticizing Agents
  PEG 2000, sold by Clariant: polyethylene glycol; molecular weight 2000
  PEG 300, sold by Clariant: polyethylene glycol; molecular weight 300
  CARBOWAX® 1000, sold by Union Carbide: polyethylene glycol; molecular weight 1000
  LUTENSOL® AT 50, sold by BASF: $C_{16}$-$C_{18}$ fatty alcohols; 50 EO
  ANTISTATICO® KN, sold by Sigma-Aldrich: (stearamidopropyl)dimethyl(β-hydroxyethyl)ammonium nitrate
  K-FLEX® 500, sold by Noveon: diethylene/dipropylene glycol dibenzoate; solids content: 100%
  SETILON® KN, sold by Cognis: ethoxylated $C_8$-$C_{22}$ fatty alcohols; solids content: 57%
  TEXLUBE® NI/CS2, sold by Achitex: mixture of ethoxylated alcohols and of glycerol esters; solids content: 100%
  LUBRONYL® GF, sold by Kemira Chimie: mixture of ethoxylated $C_{16}$-$C_{18}$ fatty amines and of petroleum distillates of alkylbenzene type
  EMEREST® 2856 A, sold by Cognis: ethoxylated pelargonic acid; 10 EO
  CITROFLEX® B6, sold by Morflex: tri(n-hexyl) n-butyrylcitrate Catalysts/Lubricants
  EMERY® 6717L, sold by Cognis: polyamides of acetic acid, of $C_5$-$C_9$ carboxylic acids and of diethylenetriamine-ethyleneimine
  EMERY® 6760, sold by Cognis: polyamides of acetic acid, of $C_5$-$C_9$ carboxylic acids and of diethylenetriamine-ethyleneimine; solids content: 50%
  NEOXIL® AO 83634, sold by DSM: ($C_{16}$-$C_{18}$)alkylimidazolinium ethosulphate; solids content: 100%

Agent for Controlling the OH Groups of the Polysaccharide
  RHODOCOAT® WT 1000, sold by Rhodia: aqueous emulsion of aliphatic polyisocyanate masked with 2-butanone oxime; solids content: 63%

3—Viscosity

It is measured using a Brookfield LVF viscometer equipped with a spindle of LV type under the following conditions: the spindle is immersed in 500 g of a sizing composition present in a cylindrical container with a diameter of 9 cm, the spindle is rotated at the appropriate speed (for example, a No. 2 spindle rotating at 60 rpm makes it possible to measure viscosity of up to 500 mPa·s) for 1 minute, and the viscosity is measured. The viscosity is measured at 25° C. and is expressed in mPa·s.

The measured value does not correspond to the absolute value of the viscosity; the measured values can be compared with one another.

Glass Strands

1—Loss on Ignition

It is measured according to Standard ISO 1887 and is expressed as %.

2—Amount of Fuzz

The amount of fuzz makes it possible to assess the resistance to abrasion of a strand. It is measured by weighing the amount of material which separates from the strand after the latter has passed over a series of 4 or 6 cylindrical ceramic bars positioned so that the deflection angle of the strand at each bar is equal to 90°. The amount of fuzz is given in mg per 1 kg of strand tested.

3—Tenacity of the Strand

It is evaluated by measuring the tensile breaking force under the conditions defined by Standard ISO 3341. It is expressed in N/tex.

4—Migration

It is evaluated by the ratio R of the maximum content of the size measured on the strand in the roving to a nominal level of the size. A ratio R is acceptable if it is at most equal to 2.

The length of strand L unwound from the roving necessary in order to achieve a ratio R equal to 2 is also indicated, this length corresponding to the "peeling" of the roving. It is expressed in meters.

EXAMPLES 1 TO 16

Sizing composition comprising an epoxy resin for the reinforcement of thermosetting resins.

Sizing compositions comprising the constituents appearing in Table 1 are prepared.

The sizing compositions are applied using a "full bath" sizing roll to glass filaments having a diameter equal to 19 μm (Examples 1 to 12) or 13.6 μm (Examples 13 to 16) which are gathered together into a wound strand in the form of a roving with a weight equal to 7 kg. The roving is dried at 130° C. for 15 hours (Examples 1 to 13) and at 115° C. for 15 hours and then 150° C. for 5 hours (Example 14).

The properties of the sizing compositions and of the glass strands are given in Table 1.

The glass strands according to Examples 5, 7 and 9 are used to form composite plaques comprising parallel strands under the conditions according to Standard ISO 9291 by using the following resins:

Epoxy resin composed of 100 parts by weight of Epoxy LY 564 resin (sold by Huntsman) and 96 parts by weight of Araldite XB 3486 hardener (sold by Huntsman)

Polyester resin 1: POLYTITE® 413-575 resin (sold by Reichhold), composed of 100 parts by weight of modified orthophthalic polyester resin and 1.5 parts by weight of methyl ethyl ketone peroxide (BUTANOX® M50, sold by Akzo Nobel).

Polyester resin 2, composed of 100 parts by weight of isophthalic unsaturated polyester resin (SYNOLITE® 1717N1, sold by DSM) and 1.5 parts by weight of methyl isobutyl ketone peroxide (TRIGONOX® HM, sold by Akzo Nobel Polymer Chemicals BV).

The plaques are treated under the following conditions:

|  | Temperature (° C.) | Time (hours) |
| --- | --- | --- |
| Epoxy resin | 80 | 8 |
| Polyester resin 1 | 60 | 16 |
| Polyester resin 2 | 80 | 2 |
|  | 120 | 4 |

Test specimens are cut out from the plaques and are treated for 72 hours (epoxy resin) or 24 hours (polyester resins 1 and 2) in boiling water. The three-point bending strength is measured on the test specimens in the transverse direction and the strength for a content of glass equal to 100% is calculated. The result of the measurements is given in Table 2.

EXAMPLES 17 TO 22

Sizing composition comprising a polyvinyl acetate for the reinforcement of thermosetting resins Sizing compositions comprising the constituents appearing in Table 3 are prepared.

The sizing compositions are applied to glass filaments having a diameter of 19 μm (Examples 17 to 19) and of 14 μm (Examples 20 to 22) under the conditions of Examples 1 to 16.

The properties of the sizing compositions and of the glass strands are given in Table 3.

EXAMPLES 23 TO 28

Sizing composition comprising an epoxy polyester for the reinforcement of thermosetting resins Sizing compositions comprising constituents appearing in Table 4 are prepared.

The sizing compositions are applied to glass filaments having a diameter of 19 μm (Examples 23 to 25) and 14 μm (Examples 26 to 28) under the conditions of Examples 1 to 16.

The properties of the sizing compositions and of the glass strands are given in Table 4.

EXAMPLES 29 TO 31

Sizing composition comprising a polypropylene grafted with maleic anhydride for the reinforcement of thermoplastic resins Sizing compositions comprising the constituents appearing in Table 5 are prepared.

The sizing compositions are applied to glass filaments under the conditions of Examples 1 to 16.

The properties of the sizing compositions and of the glass strands are given in Table 5.

EXAMPLES 32 TO 34

Sizing composition intended to be applied to fin strands

Sizing compositions comprising the constituents appearing in Table 6 are prepared.

The sizing compositions are applied under the conditions of Examples 1 to 16 to glass filaments with a diameter equal to 13.5 μm.

The properties of the sizing compositions and of the glass strands are given in Table 6.

TABLE 1

| | Ex. 1 | Ex. 2 | Ex. 3 | Ex. 4(c) | Ex. 5 | Ex. 6(c) | Ex. 7 | Ex. 8(c) |
|---|---|---|---|---|---|---|---|---|
| Coupling agent | | | | | | | | |
| SILQUEST ® A174 | 0.55 | 0.55 | 0.55 | 0.55 | 0.45 | 0.45 | 0.45 | 0.45 |
| SILQUEST ® A1387 | 0.20 | 0.20 | 0.20 | 0.20 | 0.20 | 0.20 | 0.20 | 0.20 |
| SILQUEST ® A187 | — | — | — | — | 0.20 | 0.20 | 0.20 | 0.20 |
| SILQUEST ® A1128 | — | — | — | — | — | — | — | — |
| Film-forming agent | | | | | | | | |
| EPIREZ ® 3510 W60 | 4.00 | 4.00 | 4.00 | 4.00 | 4.00 | 4.00 | — | — |
| EPIREZ ® 3515 W60 | — | — | — | — | — | — | 4.00 | 4.00 |
| NEOXIL ® 962D | 2.25 | 2.25 | 2.25 | 2.25 | 2.5 | 2.5 | 1.53 | 1.53 |
| NEOXIL ® 961D | — | — | — | — | — | — | 1.00 | 1.00 |
| Lubricant | | | | | | | | |
| SETILON ® KN | 0.13 | 0.13 | 0.13 | 0.13 | 0.13 | 0.13 | 0.13 | 0.13 |
| TEXLUBE ® NI/CS2 | 0.32 | 0.32 | 0.32 | 0.32 | 0.44 | 0.44 | 0.22 | 0.22 |
| NEOXIL ® AO 83634 | — | — | — | — | 0.20 | 0.20 | 0.10 | 0.10 |
| Texturing agent | | | | | | | | |
| RHEOZAN ® | — | 0.50 | — | — | 0.50 | — | 0.50 | — |
| KELZAN ® | 0.50 | — | — | — | — | — | — | — |
| RHODOPOL ® | — | — | 0.50 | — | — | — | — | — |
| Composition | | | | | | | | |
| Viscosity (mPa · s) | n.d. | n.d. | 5 | n.d. | n.d. | 5 | 35 | 5 |
| Strand | | | | | | | | |
| Linear density (tex) | 618 | 625 | 661 | 638 | 600 | 574 | 559 | 596 |
| Loss on ignition (%) | 0.63 | 0.59 | 0.55 | 0.54 | 0.54 | 0.55 | 0.71 | 0.61 |
| Fuzz (mg/kg)/number of bars | 183/4 | 5.6/4 | 53.2/4 | 26/4 | 29/6 | 9.2/6 | 13.8/6 | 49.6/6 |
| Tenacity (N/tex) | 0.23 | 0.36 | 0.29 | 0.49 | 0.42 | 0.46 | 0.43 | 0.43 |
| Migration | no | no | no | yes | no | yes | no | yes |
| R | — | — | — | n.d. | — | 2.13 | — | 2.02 |
| L (m) | — | — | — | n.d. | — | 300 | — | 100 |

| | Ex. 9 | Ex. 10(c) | Ex. 11 | Ex. 12(c) | Ex. 13 | Ex. 14 | Ex. 15 | Ex. 16(c) |
|---|---|---|---|---|---|---|---|---|
| Coupling agent | | | | | | | | |
| SILQUEST ® A174 | 0.55 | 0.55 | 0.45 | 0.45 | 0.55 | 0.55 | 0.55 | 0.55 |
| SILQUEST ® A1387 | 0.15 | 0.15 | — | — | 0.20 | 0.20 | 0.20 | 0.20 |
| SILQUEST ® A187 | 0.30 | 0.30 | 0.20 | 0.20 | — | — | — | — |
| SILQUEST ® A1128 | — | — | 0.20 | 0.20 | — | — | — | — |

TABLE 1-continued

| Film-forming agent | | | | | | | | |
|---|---|---|---|---|---|---|---|---|
| EPIREZ ® 3510 W60 | — | — | — | — | 4.00 | 4.00 | 4.00 | 4.00 |
| EPIREZ ® 3515 W60 | 4.00 | 4.00 | 4.00 | 4.00 | — | — | — | — |
| NEOXIL ® 962D | 2.53 | 2.53 | 1.53 | 1.53 | 2.53 | 2.53 | 2.53 | 2.53 |
| NeOXIL ® 961D | — | — | 1.00 | 1.00 | — | — | — | — |
| Lubricant | | | | | | | | |
| SETILON ® KN | 0.13 | 0.13 | 0.13 | 0.13 | 0.13 | 0.13 | 0.13 | 0.13 |
| TEXLUBE ® NI/CS2 | 0.22 | 0.22 | 0.22 | 0.22 | 0.29 | 0.29 | 0.29 | 0.29 |
| NEOXIL ® AO 83634 | 0.10 | 0.10 | 0.10 | 0.10 | — | — | — | — |
| Texturing agent | | | | | | | | |
| RHEOZAN ® | 0.50 | — | 0.43 | — | 0.50 | 0.50 | 0.50 | — |
| KELZAN ® | — | — | — | — | — | — | — | — |
| RHODOPOL ® | — | — | — | — | — | — | — | — |
| Agent for controlling the OH groups | | | | | | | | |
| RHODOCOAT ® WT 1000 | — | — | — | — | — | 1.80 | — | — |
| Citric acid | — | — | — | — | — | — | 0.50 | — |
| Composition | | | | | | | | |
| Viscosity (mPa · s) | 60 | 5 | 330 | 5 | 375 | 820 | 355 | 5 |
| Solids (%) | 4.81 | 4.31 | 4.53 | 4.10 | 4.38 | 4.40 | 4.25 | 4.42 |
| Strand | | | | | | | | |
| Linear density (tex) | 582 | 583 | 553 | 544 | 296 | 288 | 291 | 290 |
| Loss on ignition (%) | 0.53 | 0.41 | 0.93 | 0.79 | 0.75 | 0.76 | 0.60 | 0.59 |
| Fuzz (mg/kg)/number of bars | 0.36/4 | 0.38/4 | 98.6/4 | 50.4/4 | 10.7/4 | 34.1/6 | 10.7/6 | 3.9/4 |
| Tenacity (N/tex) | 0.38 | 0.38 | 0.48 | 0.47 | 0.44 | 0.52 | 0.52 | 0.50 |
| Migration | no | yes | no | yes | no | no | no | yes |
| R | — | 2.35 | — | 2.67 | — | — | — | 2.60 |
| L (m) | — | 450 | — | 1050 | — | — | — | 950 | n.d.: not determined;
(c): comparative

TABLE 2

| | Ex. 5 | Ex. 6(c) | Ex. 7 | Ex. 8(c) | Ex. 9 | Ex. 10(c) |
|---|---|---|---|---|---|---|
| EPOXY RESIN | | | | | | |
| Strength for 100% glass (MPa) | | | | | | |
| Initial | 1750 | 1860 | 1740 | 1820 | 1850 | 1800 |
| After ageing | 1400 | 1460 | 1380 | 1300 | 1400 | 1350 |
| Strength in the transverse direction (MPa) | | | | | | |
| Initial | 54 | 62 | 33 | 75 | 45 | 52 |
| After ageing | 40 | 43 | 24 | 54 | 30 | 35 |
| POLYESTER RESIN 1 | | | | | | |
| Strength for 100% glass (MPa) | | | | | | |
| Initial | 2430 | 2420 | 2360 | 2540 | n.d. | n.d. |
| After ageing | 1750 | 1850 | 1900 | 1940 | n.d. | n.d. |
| Strength in the transverse direction (MPa) | | | | | | |
| Initial | 54 | 60 | 53 | 63 | n.d. | n.d. |
| After ageing | 30 | 47 | 32 | 43 | n.d. | n.d. |
| POLYESTER RESIN 2 | | | | | | |
| Strength for 100% glass (MPa) | | | | | | |
| Initial | n.d. | n.d. | 2360 | 2700 | 2900 | 2800 |
| After ageing | n.d. | n.d. | 2150 | 2108 | 2350 | 2200 |
| Strength in the transverse direction (MPa) | | | | | | |
| Initial | n.d. | n.d. | 57 | 36 | 56 | 60 |
| After ageing | n.d. | n.d. | 39 | 44 | 35 | 35 | n.d.: not determined;
(c): comparative

TABLE 3

|  | Ex. 17 | Ex. 18 | Ex. 19(c) | Ex. 20 | Ex. 21 | Ex. 22(c) |
| --- | --- | --- | --- | --- | --- | --- |
| Coupling agent | | | | | | |
| SILQUEST ® A174 | 0.29 | 0.29 | 0.29 | 0.29 | 0.29 | 0.29 |
| SILQUEST ® A1100 | 0.19 | 0.19 | 0.19 | 0.19 | 0.19 | 0.19 |
| Film-forming agent | | | | | | |
| VINAMUL ® 8828 | 7.00 | 7.00 | 7.00 | 7.00 | 7.00 | 7.00 |
| VINAMUL ® 8852 | 3.58 | 3.58 | 3.58 | 3.58 | 3.58 | 3.58 |
| K FLEX ® 500 | 0.26 | 0.26 | 0.26 | 0.26 | 0.26 | 0.26 |
| Lubricant | | | | | | |
| FILCO ® 310 | 2.40 | 2.40 | 2.40 | 2.40 | 2.40 | 2.40 |
| EMERY ® 6760 | 0.58 | 0.58 | 0.58 | 0.58 | 0.58 | 0.58 |
| Texturing agent | | | | | | |
| KELZAN ® | — | 0.5 | — | — | 0.7 | — |
| RHODOPOL ® | 0.5 | — | — | 0.5 | — | — |
| Composition | | | | | | |
| Viscosity (mPa · s) | 275 | 40 | 5 | 180 | 275 | 5 |
| Solids (%) | 8.41 | 8.41 | 7.91 | 8.41 | 8.41 | 7.94 |
| Strand | | | | | | |
| Linear density (tex) | 568 | 581 | 557 | 357 | 337.2 | 368.8 |
| Loss on ignition (%) | 0.80 | 1.51 | 1.08 | 1.20 | 1.20 | 1.09 |
| Fuzz (mg/kg)/number of bars | 111.1/6 | 91.9/6 | 355.7/6 | 145/6 | 39.5/6 | 101.7/6 |
| Tenacity (N/tex) | 0.46 | 0.58 | 0.6 | 0.54 | 0.63 | 3.3 |
| Migration (%) | no | no | yes | no | no | yes |
| R | — | — | 4.6 | — | — | 4.4 |
| L (m) | — | — | 150 | — | — | 50 |

(c): comparative

TABLE 4

|  | Ex. 23 | Ex. 24 | Ex. 25(c) | Ex. 26 | Ex. 27 | Ex. 28(c) |
| --- | --- | --- | --- | --- | --- | --- |
| Coupling agent | | | | | | |
| SILQUEST ® A174 | 0.47 | 0.47 | 0.47 | 0.45 | 0.45 | 0.45 |
| SILQUEST ® A1387 | 0.12 | 0.12 | 0.12 | 0.12 | 0.12 | 0.12 |
| SILQUEST ® A187 | — | — | — | 0.20 | 0.20 | 0.20 |
| Film-forming agent | | | | | | |
| CARBOWAX ® 1000 | 0.41 | 0.41 | 0.41 | 0.41 | 0.41 | 0.41 |
| PEG 20000 | 0.09 | 0.09 | 0.09 | — | — | — |
| NEOXIL ® 962D | 1.03 | 1.03 | 1.03 | 1.00 | 1.00 | 1.00 |
| EPIREZ ® 3515 W60 | 1.54 | 1.54 | 1.54 | 2.50 | 2.50 | 2.50 |
| Lubricant | | | | | | |
| EMERY ® 6717 | 0.03 | 0.03 | 0.03 | 0.32 | 0.32 | 0.32 |
| L LUBRONYL ® GF | | | | | | |
| EMEREST ® 2856A | 0.25 | 0.25 | 0.25 | 0.25 | 0.25 | 0.25 |
| CITROFLEX ® B6 | 0.78 | 0.78 | 0.78 | 0.50 | 0.50 | 0.50 |
| Texturing agent | 0.20 | 0.20 | 0.20 | — | — | — |
| KELZAN ® | — | 0.50 | — | — | 0.50 | — |
| RHODOPOL ® | 0.45 | — | — | 0.45 | — | — |
| Composition | | | | | | |
| Viscosity (mPa · s) | 172.5 | 177.5 | 5 | 155 | 155 | 5 |
| Solids (%) | 4.12 | 4.17 | 3.67 | 5.36 | 5.41 | 4.91 |
| Strand | | | | | | |
| Linear density (tex) | 555 | 569 | 558 | 368 | 367 | 375 |
| Loss on ignition (%) | 0.75 | 0.79 | 0.54 | 0.50 | 0.53 | 0.45 |
| Fuzz (mg/kg)/number of bars | 31.2/6 | 22.0/6 | 7.9/6 | 28.1/6 | 63.1/6 | 35.4/6 |
| Tenacity (N/tex) | 0.32 | 0.39 | 0.41 | 0.44 | 0.38 | 0.47 |
| Migration (%) | no | no | yes | no | no | yes |
| R | — | — | 7.8 | — | — | 6.4 |
| L (m) | — | — | 400 | — | — | 225 |

(c): comparative

TABLE 5

|  | Ex. 29 | Ex. 30 | Ex. 31(c) |
|---|---|---|---|
| Coupling agent |  |  |  |
| SILQUEST ® A1120 | 0.47 | 0.47 | 0.47 |
| Film-forming agent |  |  |  |
| LUTENSOL ® AT50 | 0.41 | 0.41 | 0.41 |
| Lubricant |  |  |  |
| POLYFINISH ® 40H | 0.03 | 0.03 | 0.03 |
| ANTISTATICO ® KN | 0.25 | 0.25 | 0.25 |
| Texturing agent |  |  |  |
| RHEOZAN ® | 0.2 | — | — |
| KELZAN ® | — | 0.3 | — |
| Composition |  |  |  |
| Viscosity (mPa · s) | 207.5 | 190 | 5 |
| Solids (%) | 5.10 | 5.20 | 4.90 |
| Strand |  |  |  |
| Linear density (tex) | 543 | 567 | 533 |
| Loss on ignition (%) | 0.85 | 0.78 | 0.63 |
| Fuzz (mg/kg)/number of bars | 31.2/6 | 22.0/6 | 7.9/6 |
| Tenacity (N/tex) | 0.48 | 0.36 | 0.48 |
| Migration (%) | no | no | yes |
| R | — | — | 7.8 |
| L (m) | — | — | 400 |

(c): comparative

TABLE 6

|  | Ex. 32 | Ex. 33 | Ex. 34(c) |
|---|---|---|---|
| Coupling agent |  |  |  |
| SILQUEST ® A174 | 0.25 | 0.25 | 0.25 |
| SILQUEST ® A1128 | 0.50 | 0.50 | 0.50 |
| Film-forming agent |  |  |  |
| AMP 90 | 0.25 | 0.25 | 0.25 |
| NAXOL ® SH | 3.50 | 3.50 | 3.50 |
| PEG 2000 | 0.10 | 0.10 | 0.10 |
| PEG 300 | 0.05 | 0.05 | 0.05 |
| Lubricating agent |  |  |  |
| EMERY ® 6760 | 0.25 | 0.25 | 0.25 |
| Texturing agent |  |  |  |
| RHEOZAN ® | 0.4 | — | — |
| RHODOPOL ® | — | 0.4 | — |
| Composition |  |  |  |
| Viscosity (mPa · s) | 335 | 1020 | 5 |
| Solids (%) | 4.91 | 4.91 | 4.5 |
| Strand |  |  |  |
| Linear density (tex) | 306 | 284 | 305 |
| Loss on ignition (%) | 0.83 | 0.88 | 0.89 |
| Fuzz (mg/kg)/number of bars | 3.3/4 | 1.7/4 | 1.5/4 |
| Tenacity (N/tex) | 0.38 | 0.38 | 0.40 |
| Migration (%) | no | no | yes |
| R | — | — | 6.3 |
| L (m) | — | — | 1100 |

(c): comparative

The invention claimed is:

1. A glass strand coated with a sizing composition consisting of, by weight percent:
   from 0.1 to 5% of at least one succinoglycan as a texturing agent;
   from 2 to 8% of at least one epoxy compound as a film-forming agent;
   from 0.1 to 8% of at least one compound selected from the group consisting of a plasticizing agent, a surface-active agent, and a dispersing agent;
   from 0.1 to 4% of at least one coupling agent; and
   from 0 to 6% of at least one additive,
   wherein the amount of size represents from 0.2 to 5% by weight of a final strand.

2. The glass strand of claim 1, wherein the texturing agent exhibits an average molecular weight of greater than 100 000.

3. The glass strand of claim 1, wherein the succinoglycan has formula (II):

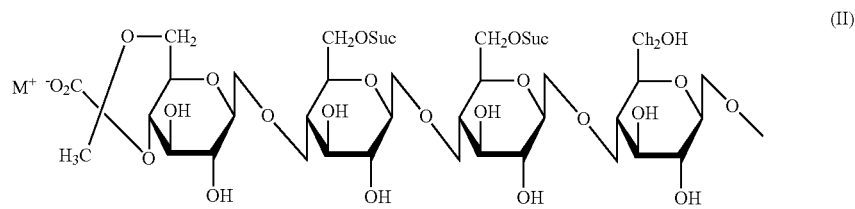

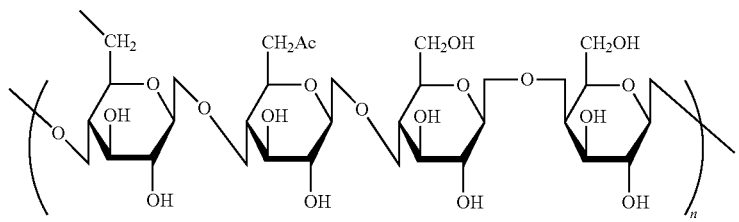

wherein:
Ac is —CO—CH₃;
Suc is —CO—(CH₂)₂—COOH;
M⁺ is Na, K, or 1/2Ca; and
n≥80.

4. The glass strand of claim 1, wherein the content of the succinoglycan is from 0.15 to 2% by weight of the sizing composition.

5. The glass strand of claim 1, wherein the content of the epoxy compound is from 2.5 to 7% by weight of the sizing composition.

6. The glass strand of claim 1, wherein the plasticizing agent, the surface-active agent, and the dispersing agent are organic compounds comprising aliphatic or aromatic polyalkoxylated compounds which are optionally halogenated, polyalkoxylated fatty acid esters and amine-comprising compounds, or inorganic compounds, including silica derivatives, or mixtures thereof.

7. The glass strand of claim 1, wherein the content of plasticizing agent, surface-active agent, and dispersing agent is from 0.15 to 4% by weight of the sizing composition.

8. The glass strand of claim 1, wherein the coupling agent is selected from the group consisting of hydrolysable compounds consisting of silane, titanate and zirconate.

9. The glass strand of claim 1, wherein the amount of coupling agent is from 0.15 to 2% by weight of the sizing composition.

10. The glass strand of claim 1, wherein the additive is a lubricating agent, a complexing agent, a gallic or phosphonic acid derivative, an antifoaming agent, or an acid.

11. The glass strand of claim 1, wherein said sizing compound exhibits a total content of additives not exceeding 3%.

12. The glass strand of claim 1, wherein said sizing compound exhibits a dry extract solids content is from 3 to 15%.

13. A composite material comprising:
   at least one organic or inorganic material, or mixtures thereof; and
   glass strands, wherein the glass strands are composed, in all or part, of the glass strands of claim 1.

14. The composite material of claim 13, wherein the level of glass is between 5 and 60%.

15. A glass strand coated with a sizing composition comprising, by weight percent:
   from 0.1 to 5% of at least one succinoglycan as a texturing agent;
   from 2 to 3.91% of at least one film-forming agent;
   from 0.1 to 8% of at least one compound selected from the group consisting of a plasticizing agent, a surface-active agent, and a dispersing agent;
   from 0.1 to 4% of at least one coupling agent; and
   from 0 to 6% of at least one additive,
   wherein the amount of size represents from 0.2 to 5% by weight of a final strand.

* * * * *